United States Patent
Luk et al.

(10) Patent No.: US 8,712,879 B2
(45) Date of Patent: Apr. 29, 2014

(54) DATA PORTAL FOR CONCURRENT ASSESSMENT

(75) Inventors: Carolyn Luk, Hillsborough, CA (US); Theresa Ann Hickman, San Carlos, CA (US); Robert C. Zwiebach, San Mateo, CA (US); Linda Wong, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1 day.

(21) Appl. No.: 13/451,976

(22) Filed: Apr. 20, 2012

(65) Prior Publication Data

US 2013/0073436 A1  Mar. 21, 2013

Related U.S. Application Data

(60) Provisional application No. 61/536,906, filed on Sep. 20, 2011.

(51) Int. Cl.
*G07B 17/00* (2006.01)

(52) U.S. Cl.
USPC .............. 705/30; 705/14.17; 705/31; 705/32; 705/68

(58) Field of Classification Search
None
See application file for complete search history.

(56) References Cited

U.S. PATENT DOCUMENTS

| | | | | |
|---|---|---|---|---|
| 6,584,453 B1* | 6/2003 | Kaplan et al. | ............. | 705/39 |
| 7,032,816 B2* | 4/2006 | Markham et al. | ............. | 235/376 |
| 7,114,649 B2* | 10/2006 | Nelson et al. | ............. | 235/379 |
| 7,131,069 B1* | 10/2006 | Rush et al. | ............. | 715/738 |
| 7,523,053 B2* | 4/2009 | Pudhukottai et al. | ............. | 705/30 |
| 8,204,809 B1* | 6/2012 | Wise | ............. | 705/35 |
| 2006/0253333 A1* | 11/2006 | Magarian et al. | ............. | 705/24 |
| 2008/0120129 A1* | 5/2008 | Seubert et al. | ............. | 705/1 |
| 2009/0138398 A1* | 5/2009 | Cole et al. | ............. | 705/42 |
| 2009/0216582 A1* | 8/2009 | Moran | ............. | 705/7 |
| 2009/0271300 A1* | 10/2009 | Mundy | ............. | 705/30 |

* cited by examiner

*Primary Examiner* — Fateh Obaid
(74) *Attorney, Agent, or Firm* — Kilpatrick Townsend & Stockton LLP

(57) ABSTRACT

A method of concurrently assessing a closure status for multiple ledgers may comprise accessing a general ledger and a plurality of subledgers including a first subledger and a second subledger, having first and second close periods, respectively. The method may also include translating the second subledger such that the second subledger has the first close period, and determining a closure status for each subledger over the first period. The method may additionally include determining a status for the general ledger indicating a closure status over the first period, and concurrently displaying an indication for each of the plurality of subledgers and the general ledger. The method may further include displaying the status of each of the plurality of subledgers next to the indication for each, and displaying the status of the general ledger next to the indication for the general ledger.

20 Claims, 13 Drawing Sheets

| Ledger Vision Operations (USA) Accounting Period Sep-10 | | |
|---|---|---|
| Cost Organization | Period Status | Cost Book |
| ZCST-Seattle | Open | ZCST-Seattle |
| ZCST-Vision Ops | Open | ZCST-Vision Ops |
| ZCST-Dallas | Closed | ZCST-Dallas |

610

| Ledger Vision Operations (USA) Accounting Period End Date 9/10 | | |
|---|---|---|
| Asset Book | Asset Period | Period Status |
| VISION LEASE FOR MULTI GAP | Sep9-30 | Closed |
| VISION LEASE TAX (STATE) | Sep9-30 | Closed |
| VISION LEASE TAX BOOK | Dec12-30 | Open |
| Vision Operations US Crop | Dec12-30 | Open |

DATA PORTAL FOR CONCURRENT ASSESSMENT

CROSS-REFERENCES TO RELATED APPLICATIONS

The present application claims benefit under 35 USC 119(e) of U.S. Provisional Application No. 61/536,906, filed on Sep. 20, 2011 by Carolyn Luk and entitled "Mechanism To Comprehensively Review In A Single Portlet The Readiness Of The Organization To Complete The Financial Close Across The Enterprise," of which the entire disclosure is incorporated herein by reference for all purposes.

BACKGROUND

Enterprise resource planning (ERP) systems integrate internal and external management information across an entire organization. ERP systems may embrace finance/accounting, manufacturing, sales and service, customer relationship management, human resource management, and the like. ERP systems may be used to automate activities between these different resources within an integrated software application. One purpose may be to facilitate the flow of information between business functions across boundaries of an organization, and to manage the connections between outside stakeholders and internal resources.

Each resource with an ERP system may include many subsystems to manage various resources. For example, a finance/accounting application in an ERP system may be distributed among many different departments within an organization, and may be used to manage many different types of financial accounts. These different types of financial accounts may be managed using different products in the ERP system. Each of these products are typically specially tailored to handle one particular type of financial account. For example, an asset ledger may be used to track the accounting status of business assets. Although these different products are designed to handle specific accounts, each of them may be relevant when generating period end accounting statements, audit records and internal statistics.

BRIEF SUMMARY

In one embodiment, a method of concurrently assessing a closure status for multiple ledgers in an Enterprise Accounting System is discussed. The method may comprise accessing a general ledger and a plurality of subledgers. In one embodiment, the plurality of subledgers may be comprised of a first subledger and a second subledger, the first subledger may have a first close period, and the second subledger may have a second close period. The method may also include translating the second subledger such that the second subledger has the first close period, and determining a status for each subledger. In one embodiment, the status may indicate a closure status for each subledger over the first period. The method may additionally include determining a status for the general ledger. In one embodiment, the status may indicate a closure status of the general ledger over the first period. The method may further include concurrently displaying an indication for each of the plurality of subledgers and the general ledger, and displaying the status of each of the plurality of subledgers next to the indication for each of the plurality of subledgers, and displaying the status of the general ledger next to the indication for the general ledger.

In another embodiment, a computer-readable memory is discussed. The computer-readable memory may have stored thereon a sequence of instructions which, when executed by one or more processors, causes the one or more processors to assess a closure status for multiple ledgers in an Enterprise Accounting System by: accessing a general ledger and a plurality of subledgers, wherein the plurality of subledgers may be comprised of a first subledger and a second subledger, the first subledger has a first close period, and the second subledger has a second close period; translating the second subledger such that the second subledger has the first close period; determining a status for each subledger, wherein the status may indicate a closure status for each subledger over the first period; determining a status for the general ledger, wherein the status may indicate a closure status of the general ledger over the first period; concurrently displaying an indication for each of the plurality of subledgers and the general ledger; and displaying the status of each of the plurality of subledgers next to the indication for each of the plurality of subledgers, and displaying the status of the general ledger next to the indication for the general ledger.

In yet another embodiment, a system comprising a processor and a memory communicatively coupled with and readable by the processor is discussed. The memory may have stored therein a sequence of instructions which, when executed by the processor, cause the processor to filter a plurality of accounts in an Account Reconciliation Management System by: accessing a general ledger and a plurality of subledgers, wherein the plurality of subledgers may be comprised of a first subledger and a second subledger, the first subledger has a first close period, and the second subledger has a second close period; translating the second subledger such that the second subledger has the first close period; determining a status for each subledger, wherein the status may indicate a closure status for each subledger over the first period; determining a status for the general ledger, wherein the status may indicate a closure status of the general ledger over the first period; concurrently displaying an indication for each of the plurality of subledgers and the general ledger; and displaying the status of each of the plurality of subledgers next to the indication for each of the plurality of subledgers, and displaying the status of the general ledger next to the indication for the general ledger.

The method, computer-readable memory, and/or system may also include receiving an input, determining that the input is associated with the first subledger, and displaying, in response to the determination, a table comprised of a plurality of books associated with the first subledger. In one embodiment, the table may be further comprised of a closure status for each of the plurality of books associate with the first subledger. In another embodiment, the input may comprise a mouse rollover event. In another embodiment, translating the second subledger such that the second subledger has the first close period comprises: determining a close date for the first close period; determining that the close date falls within the second close period; and assigning a closure status of the second subledger in the second close period to comprise a closure status of the second subledger in the first close period. In another embodiment, the status for each subledger may be comprised of: a closed state, a partially closed state, and an open state. In another embodiment, the plurality of subledgers may be comprised of: a receivables subledger, a costing subledger, a projects subledger, a payables subledger, and an assets subledger. In another embodiment, each of the indications for each of the plurality of subledgers may be arranged graphically in relation to the indication for the general ledger to indicate that the general ledger is dependent on the plurality of subledgers. In yet another embodiment, the status of the general ledger may be a function of at least the statuses for each of the plurality of subledgers.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates an example of translating attributes of different account, according to one embodiment.

FIG. 13 illustrates an interface for viewing and editing the closure statuses of a single ledger across multiple accounting periods, according to one embodiment.

DETAILED DESCRIPTION

Figure 1:
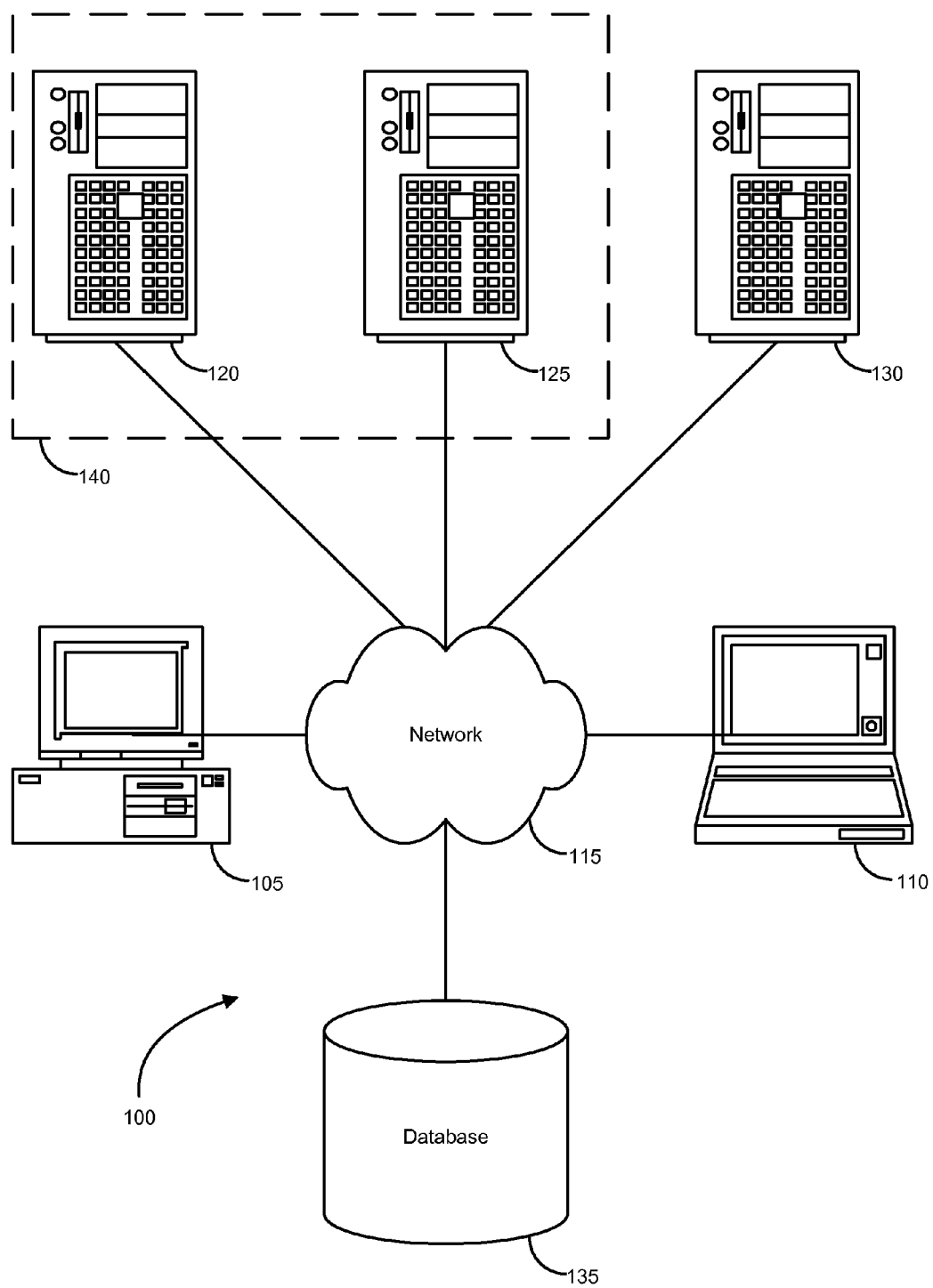
FIG. 1 illustrates a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments that may be used to quickly assess a closure status for a number of different subledgers and a general ledger for a selected subsidiary or all subsidiaries at the same time. A summary window may be provided displaying an icon for both the general ledger and for each individual subledger for each subsidiary. Also displayed may be a status indicator describing a closure status, such as closed, partially closed, or open, of each ledger and subledger for a given close period. Different ledgers may have different accounting periods; therefore, in the summary window, the status of each subledger may be translated into a common close period. To gain additional information, the user may provide input, such as a mouse over event, associated with one of the subledger icons. In response, a summary table displaying additional information for that ledger may be displayed.

In an Enterprise Resource Planning (ERP) system, different software modules may be used to describe each type of subledger. For example, subledgers may be available for receivables, purchasing, costing, projects, payables, assets, and/or the like. Often, each of these subledgers may be used primarily by a department within an organization responsible for that type of account. For example, a payables subledger may be used by an accounts payable apartment, and a purchasing subledger may be used by a purchasing department. During the day-to-day activities of the separate departments, there may be little need to know the status of the subledgers associated within the other departments. Consequently, each department may manage the opening and closing of financial periods separately. Therefore, each subledger may have a dedicated user interface for this task with product specific business rules that determine when a period may be opened and/or closed.

However, when analyzing the general ledger, the status of each subledger may be of interest. To provide a more consistent user experience and to provide more visibility in the organization to review period statuses across products for a given subledger, it may be beneficial to provide a unified user interface in an ERP system for managing accounting period statuses that can be used by the general ledger, along with each individual subledger. A unified period status management interface that provides users with greater visibility of the period statuses of multiple applications and ledgers accessible from a single interface may offer benefits during the period close process. The single interface may have a consistent period management scheme, a common format for data presentation, and unified general business rules across multiple products. This may deliver uniformity in user experience that may not be possible using separate interfaces for each subledger.

As used herein, the term "status management interface" may be used to describe any user interface that provides a closure status for both the general ledger and a plurality of subledgers. The status management interface may be textual, and indications may be textual descriptions of the various ledgers and/or subledgers. In another embodiment, the status management interface may be graphical, and indications may be in the form of graphical icons that may be selected by an input device. The status management interface may be provided on many possible output devices. In one embodiment, the status management interface may be provided on a computer screen, while other embodiments may use the screen on a mobile phone, laptop computer, projector screen, a tablet computer, PDA screen, and/or the like.

In some embodiments, the status management interface may provide both a summary view and detailed view of the closure status information for various ledgers and/or subledgers. A summary view may cut across a broad set of information at an overview level. It may show the status of a selected range of periods for all of the ledgers, including a selected close period, as well as a period before and after the selected period. Status changes may be effected and seen across the various subledgers from the status management interface with a single request. At the same time, a user may drill down into the period status details of a particular subledger to more closely review the status of each account.

In order to deliver a consistent experience across each account under any kind of status change, the process of opening or closing a period may also perform any necessary validations required by a set of business rules. A notification process may be used to provide feedback describing the outcome of request status change to a user. This immediate feedback may prevent a user from having to wait around for extensive validations to be processed.

As mentioned earlier, each subledger may have its own unique validation and processing routine as accounting periods are open or closed for each account. With the status management interface, it is possible to hide these differences and present the user with a uniform set of indications and commands. Thus, instead of forcing the user to deal with different interfaces with different validation rules, the status management interface streamlines this process at the overview level, while preserving the ability to drill down into the specific details of each subledger within one interface.

The embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
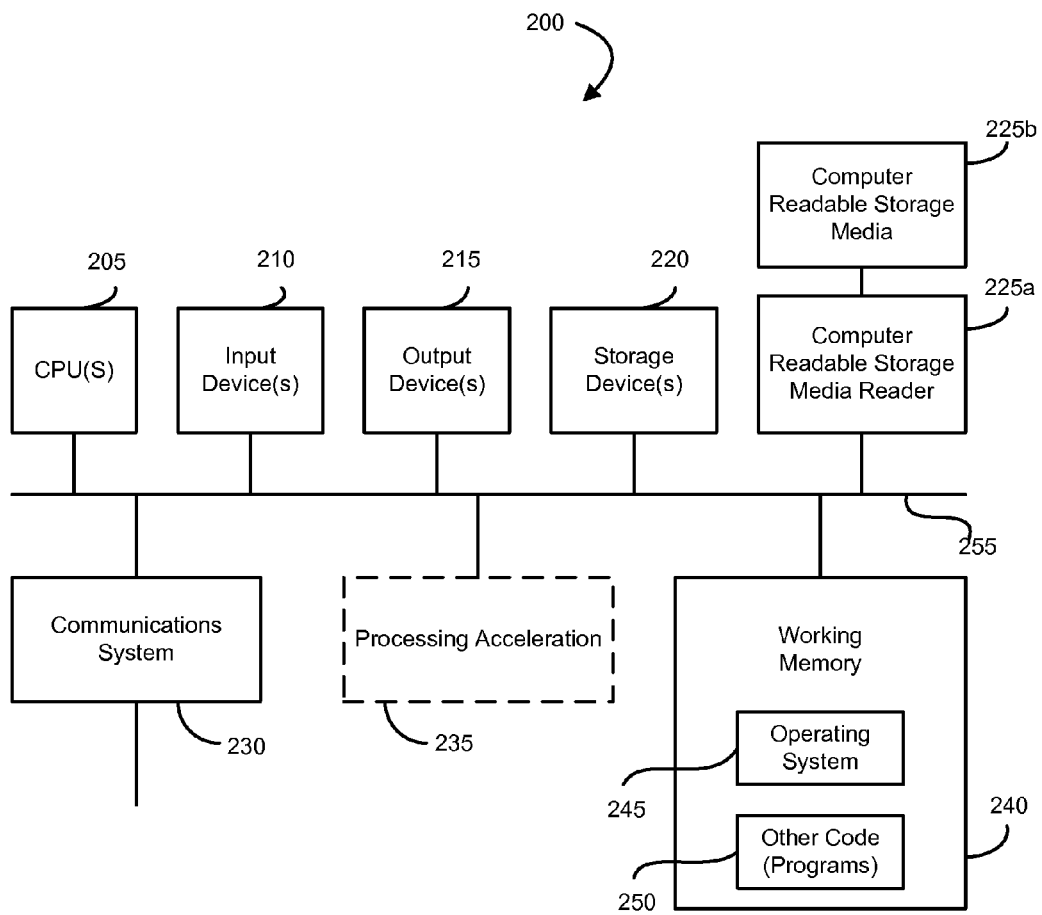
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and or requests to and from the computer system which may or may not involve a user. Therefore, it will be understood in light of this disclosure, that each step and each method described herein may be altered to include an input and output to and from a user, or may be done automatically by a computer system.

Figure 3:
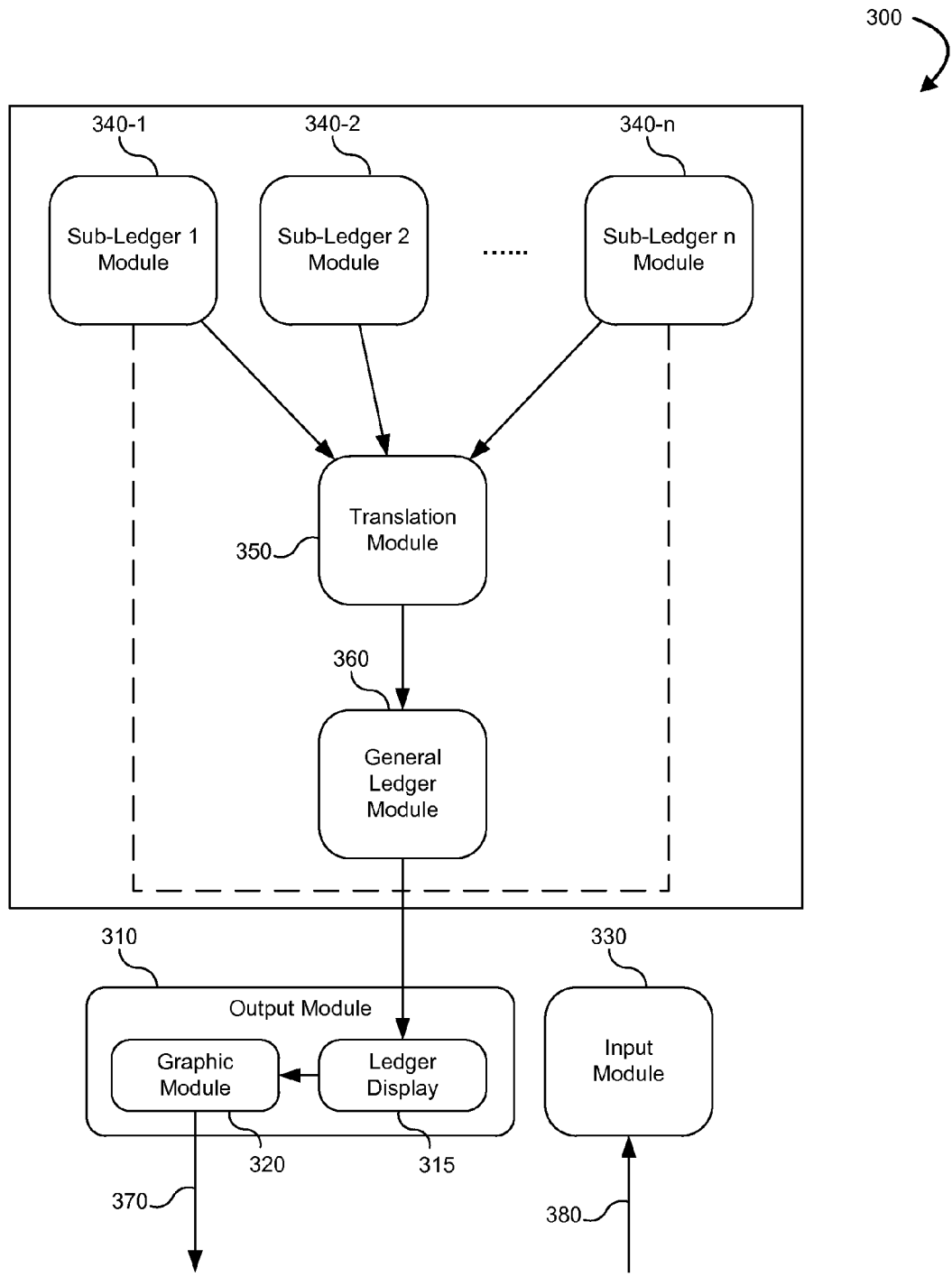
FIG. 3 illustrates a block diagram of a system for concurrently assessing the closure status for multiple ledgers, according to one embodiment.

FIG. 3 illustrates a block diagram 300 of a system for concurrently assessing the closure status for multiple ledgers, according to one embodiment. A plurality of subledger modules 340 may be used to process and/or manage a plurality of subledgers. For example a first subledger may be processed and/or managed by subledger module 340-1, while a second subledger may be processed and/or managed by subledger module 340-2. Each of the plurality of subledger modules 340 may deal with different accounts, use different validations, and may be associated with different business rules. Furthermore, each of the plurality of subledger modules 340 may be used by a different organization within the enterprise, or may be shared amongst organizations.

Because each of the plurality of subledger modules 340 may have different validations, business rules, and/or accounts, a translation module 350 may be provided. The translation module 350 may be used to translate one or more of the attributes of a first subledger to match the attributes of a second subledger. For example, two subledgers may have different close periods. The translation module 350 may translate a close period of the first subledger to match the close period of the second subledger. In another embodiment, some subledgers may have different statuses describing their closure status. For example a first subledger may be described using the statuses open, closed, and partially closed. The second subledger may be described using the statuses of open, closed, and permanently closed. The translation module 350 may translate the status of permanently closed in the second subledger to the status of closed in the first subledger. In another embodiment, the translation module 350 may be used to translate business rules that differ between two subledgers. In other embodiments, the translation module 350 may be used to detect differences between subledgers and then translate those differences into a common format for display in the status management interface.

A general ledger module 360 may be provided to determine a general closure status based on the closure statuses provided by the plurality of subledger modules 340 and translated by a translation module 350. In one embodiment, the general ledger module 360 may determine a general status from the individual statuses. For example, if each of the plurality of subledger modules 340 indicate that their status is closed or permanently closed, then the general ledger module 360 may indicate that its status is also closed. In another embodiment, the general ledger module 360 may derive its closure status based on the general ledger itself. For example, if the general ledger has the status of closed, the status management interface may indicate that the general ledger's status is closed even if one or more of plurality of subledger modules 340 indicates that its status remains open. In yet another embodiment, the general ledger module 360 need not rely on the translation module 350. For example, the general ledger module 360 may determine that its status should be open if one or more of the plurality of subledger modules 340 provides any status other than open. Thus, if subledger module 340-2 indicates that its status is partially closed, then the general subledger module 360 may determine that its status should be open. It will be understood in light of this disclosure that the general ledger module 360 may use any combination of inputs described above, whether translated or untranslated, to determine the closure status of the general ledger.

An output module 310 may be provided to display indications for both the general ledger module 360, along with the plurality of subledger modules 340. In one embodiment, the output module 310 may receive an output from each of the plurality of subledger modules 340. In another embodiment, the output module 310 may receive an output from the translation module 350 and display translated output.

The output module 310 may be comprised of a ledger display module 315 and a graphic module 320. The ledger display module 315 may be configured to generate an indication and a status for each subledger and the general ledger. For example, the ledger display module 315 may be configured to generate, retrieve, or load, a graphic icon associated with each subledger. The ledger display module 315 may also be configured to generate a graphical indication of a closure status for each ledger. In one embodiment, the graphical indication of a closure status may be a graphic displaying an open book, a closed book, and/or a partially closed book. In another embodiment, the graphical indication of the closure status for each ledger may be the textual display of the word "closed", "open", and/or the like.

The graphic module 320 may be configured to receive the output from the ledger display module 315 to generate a display that may be viewed by a user on a computer screen. The graphic module 320 may provide an output 370 that may be rendered on touchscreen tablet computer, the screen of a mobile phone, the screen of a desktop computer, and/or the like. In one embodiment, the output module may provide an additional output in the form of a data stream to an additional software process. The additional software process may use the closure information provided by the output module to perform further accounting tasks, such as generating reports, generating letters to clients, generating balance sheets, and/or the like.

An input module 330 may be configured to receive an input 380. It may be determined that the input 380 is associated with one or more of the plurality of subledgers. It may also be determined that the input 380 represents an indication that additional information should be displayed for the associated subledger. The input module 330 may communicate with the output module 310 such additional information may be provided for the particular subledger associated with the input 380. For example, the input 380 may be a mouse rollover event for an icon generated by the output module 310, and associated with one of the subledgers. In this case, the output module may display additional information for the subledger, such as a table of summary information for a subset of the accounts in that subledger. In another embodiment, input 380 may be a mouse click selecting an icon generated by the output module 310 and associated with one of the subledgers. In this case, the output module 310 may open an additional window to directly edit, analyze, process, close, open, and/or view the particular subledger selected.

In one embodiment, the various software modules in FIG. 3 may reside on separate computer systems. Alternatively, multiple software modules may be combined on the same or similar computer systems. In addition, some software modules may be combined together into a single software module performing the functions of both individual software modules. Similarly, a single software module may be split into multiple software modules. It will be understood in light of this disclosure that any arrangement of the software modules, as well as any implementation in both software and hardware, may be used by various embodiments.

Figure 4:
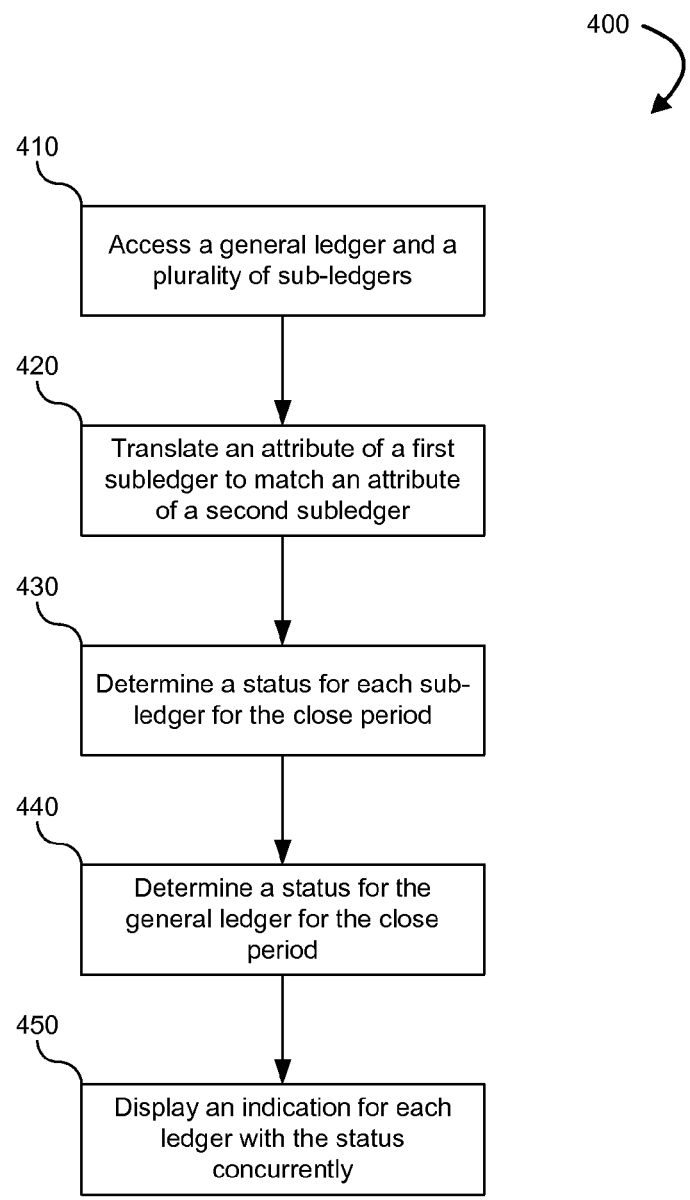
FIG. 4 illustrates a high-level flowchart of a method of concurrently assessing the closure status for multiple ledgers, according to one embodiment.

FIG. 4 illustrates a high-level flowchart 400 of a method of concurrently assessing the closure status for multiple ledgers, according to one embodiment. At step 410, a general ledger and a plurality of subledgers may be accessed. The subledgers may be in use by various departments and software modules across an ERP system. In one embodiment, the subledgers may be a part of a general ledger, and only differentiated by assigned attributes. In another embodiment, the general ledger and subledgers may be stored in the same or different databases. In yet another embodiment, data for the subledgers may be accessed from remote locations and downloaded for analysis.

At step 420, one or more attributes of a first subledger may be translated to match the attributes of a second subledger. As described earlier, different subledgers may have different attributes such as the close period, validations, or business rules. For example, an asset subledger may use a yearly close period, while a payables subledger may use a monthly close period. In one embodiment, one subledger may have a close period that ends in the middle of the close period of another subledger. In this case, the close status from two different periods may be combined. Alternatively, a close status may be determined for portions of the overlapping periods to determine a close status that matches the rest of the subledgers.

Step 430, a status may be determined for each subledger for the close period. Again, if different subledgers have different close statuses, the different statuses may be transformed to fit within a common set of statuses that may be applied to each subledger. For example, a payables subledger may have the following statuses: never opened, future enterable, open, closed, and permanently closed. In comparison, a purchasing subledger may have the same statuses as the payables subledger, except instead of a permanently closed status, a close pending status may be used. In one embodiment, a standard set of statuses may be determined and used for the general ledger, and the status types for each subledger may be translated into the standard set of statuses. For example, if the general ledger uses the statuses of open, closed, and partially closed, then the purchasing subledger described above with a close pending status may be described using the partially closed status from the standard set of statuses.

At step 440, a status may also be determined for the general ledger for the close period. In one embodiment, the status of the general ledger may be derived from individual statuses of each subledger. In another embodiment, the status of the general ledger may be determined by analyzing the general ledger itself, and may or may not include any analysis of the statuses of the subledgers. In yet another embodiment, the status of the general ledger may be determined to be open unless the status for every subledger is either closed or permanently closed. If the general ledger status is viewed in a status management interface that also displays the status of the subledgers, then any change in the status of the subledgers may immediately be reflected in the status of the general ledger.

At step 450, an indication for the general ledger may be displayed along with the close status. Additionally, an indication may be displayed for each subledger, along with a close status for each subledger. In one embodiment, these indications may be graphical icons, and the statuses may be in the form of either a textual or graphical indications. In another embodiment, the indications and statuses for the general ledger and the subledgers are displayed concurrently such that the user may view the status of the general ledger and the statuses of the subledgers of the same time. This may allow for the easy diagnosis of a reason that the general ledger is not closed. If a user sees that the general ledger is open, it may be easy to determine which of the subledgers is causing general ledger to remain. Instead of separately investigating each subledger in its own software module, the user may simply see which subledger remains open and pull up additional information within the status management interface.

Figure 5:
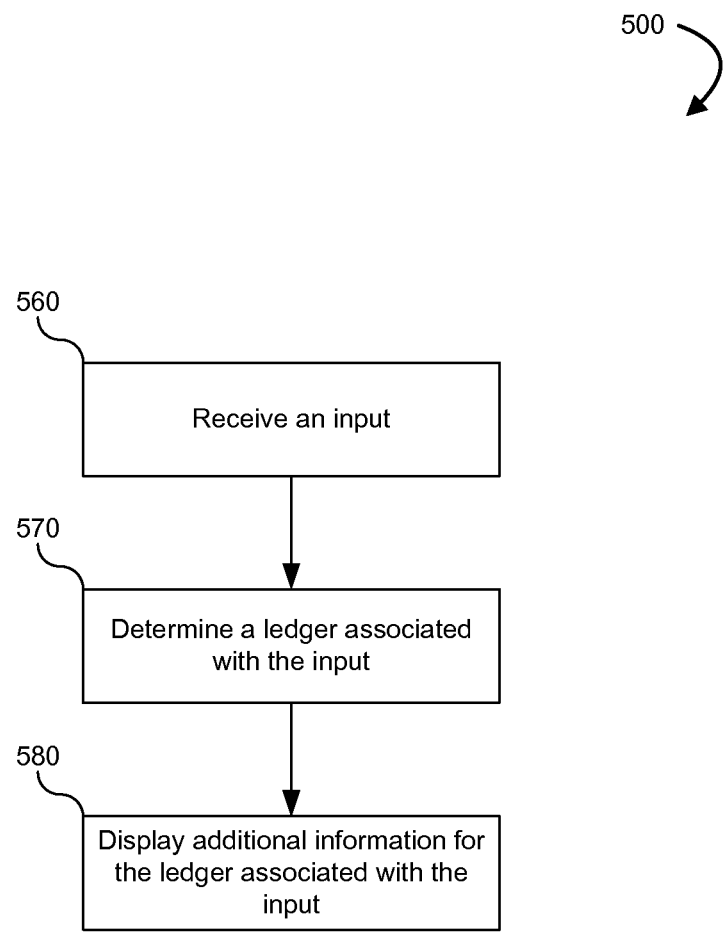
FIG. 5 illustrates a high-level flowchart of a method for viewing additional information about a subledger within the status management interface, according to one embodiment.

FIG. 5 illustrates a high-level flowchart 500 of a method for viewing additional information about a subledger within the status management interface, according to one embodiment. At step 560, an input may be received. It may be determined that the input is associated with one or more of the subledger indications displayed in step 450 of FIG. 4. For example, a user may hover a mouse icon over one of the subledger indications in the display. At step 570, a particular ledger or subledger may be selected by the input.

At step 580, additional information may be provided for the selected ledger or subledger. In one embodiment, a separate window may be displayed that includes additional information for the selected subledger. In another embodiment, the pop-up window may display a summary of information associated with the selected subledger. The additional information may include a full listing of accounts, or alternatively may include only accounts with a certain status. For example, the additional information might include a listing of accounts for which the close status remains open. Further examples and explanations for the additional information that may be displayed in response to the input are described further herein below in relation to FIG. 8, FIG. 9, and FIG. 10.

FIG. 6 illustrates an example of translating attributes of different accounts, according to one embodiment. Ledger 610 is a costing ledger for the Vision Operations (USA) subsidiary of an example organization. The period status of each of the cost books is evaluated according to a common accounting period. In this example, three cost books are determined to be either open or closed during the accounting period ending on September 10. This could be a month-long accounting period, a fiscal year, and or any other interval. Note that in this example each cost book in the costing ledger 610 uses the same accounting period. In other embodiments, books within the ledger may use different accounting periods.

Ledger 620 comprises an asset ledger for the same subsidiary. An asset ledger is one example of a ledger where different assets, or books, may have different closing periods. In some cases, an asset may be a capital asset, such as buildings or equipment, that is valued and/or depreciated based on a taxable accounting period. For example, in group 640, these two asset books are evaluated according to a yearly asset period ending on December 30 of each year. In contrast, group 630 comprises an asset books with a period ending on September 30 of each year.

In order to match the asset ledger 622 to coincide with the closing period of the costing ledger 610, one of the two ledgers must be translated to match the other. In this case, because the costing ledger 610 may follow the same accounting period as many of the other ledgers, the asset ledger 620 may be translated. In one embodiment, the closing period for each book in the asset ledger 620 may be determined by the end the date of the closing period in the costing ledger 610. In this example, it may be determined that the closing date of the accounting period from the costing ledger 610, namely September 10, should be used. The asset period for each book in the asset ledger 620 may be chosen by determining which asset period the date of September 10 falls. Here, year-long asset periods ending on September 30 and December 30 of the current include the date of September 10. Therefore, that asset period may be used to assign a closing status to the asset ledger 620. Note that this is only one example of translating the attributes of one ledger to match the attributes of another ledger in order to provide a uniform interface for evaluation. Other attributes may be translated, including names, statuses, amounts, and/or the like.

Figure 7:
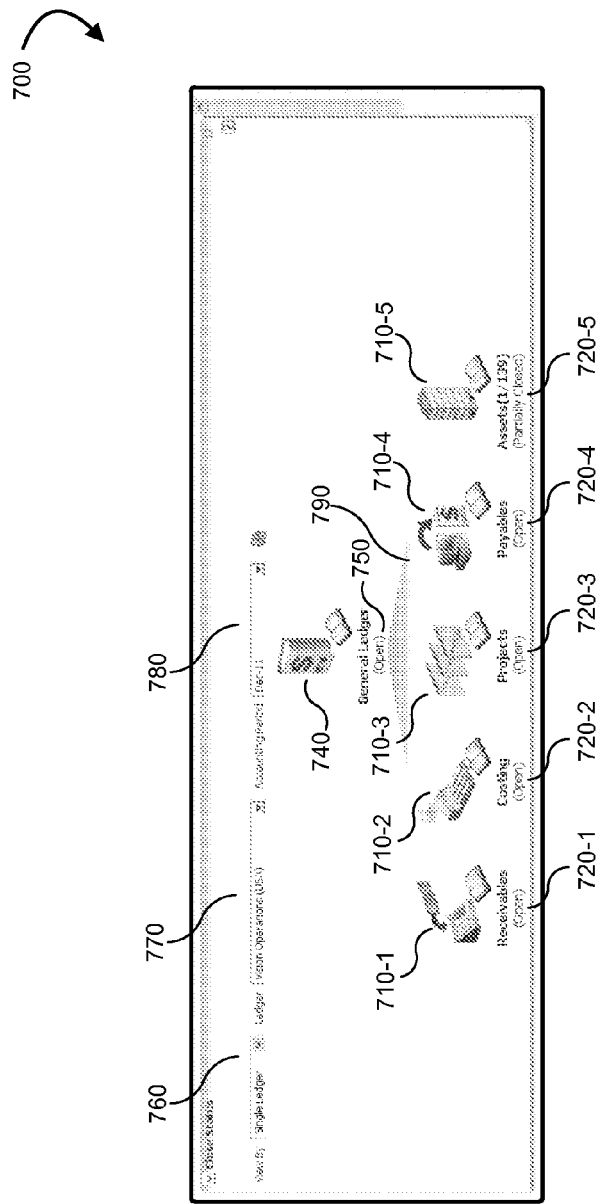
FIG. 7 illustrates an interface that can be used as a status management interface, according to one embodiment.

FIG. 7 illustrates an interface 700 that can be used as a status management interface, according to one embodiment. The interface of 700 include a plurality of subledger indications, which in this embodiment are displayed as a plurality of subledger icons 710, each of which may correspond to the different subledger. For example, subledger icon 710-1 may be associated with a receivables subledger; subledger icon 710-2 may be associated with a costing subledger; subledger icon 710-3 may be associated with a projects subledger; subledger icon 710-4 may be associated with a payables subledger; and subledger icon 710-5 may be associated with an assets subledger. The plurality of subledgers are merely exemplary, and it will be understood in light of this disclosure that many different types of subledgers may be used in the interface 700.

Although merely exemplary, the subledgers represented in interface 700 may be representative of a large number of applications. The asset subledger may represent a part of an organization's accounting records that detail the journal entries relating to the asset side of the balance sheet. The asset subledger may include accounts that may include fixed assets, facilities, equipment, and/or assets that may be capitalized. The asset subledger may also include capital assets, such as property or equipment purchased primarily for business use such as vehicles, real estate, computers, office furniture, and other fixtures.

The receivables subledger may record the transaction and payment history for each customer to whom a business organization extends credit. The balance for each customer account may be periodically reconciled with the accounts receivable balance in the general ledger for accuracy. The receivables subledger may be useful in that it may show, at a glance, the account status and amount owed by a specific customer that may not be available in the general ledger.

The costing subledger may include an entry for each cost center, job, process, product, program, and/or project that is recorded as a separate account. All costing information associated with the account may be recorded in this entry in a required amount of detail. A job or process costing entry may involve tabulation of costs such as construction, manufacturing of goods, and/or any other subprocesses required to complete the job or process.

The projects subledger may be used to record a summary of cost distribution lines by project. Projects may often be categorized as manufacturing or non-manufacturing, and the user may see manufacturing costs separately from non-manufacturing costs. Project transactions may include inventory, work in process, and/or other project related costs.

The payables subledger may record transaction payment histories for each entity to whom a business owes a liability. The balance for each customer account may periodically be reconciled with the accounts receivable balance in the general ledger for accuracy. The payables ledger, like the receivables ledger, may be useful in that it may show, at a glance, the account status and amount owed to a specific entity that may not be available to general ledger.

Below each of the plurality of subledger icons 710, a plurality of status icons 720 may also be displayed. In interface 700, each of the plurality of subledger icons 710 is associated with at least one of the plurality of status icons 720. In this embodiment, each status icon is comprised of a textual indicator for one of three statuses. For example, the status icon 720-1 displays the status of "(Open)" associated with the receivables subledger. Similarly, status icon 720-5 displays the status of "(Partially Closed)" associated with the assets subledger.

Also displayed in interface 700 is a general subledger icon 740 with an associated general ledger status icon 750. In this embodiment, the general ledger status icon 750 displays the status of "(Open)", possibly because one or more of the plurality of status icons 720 displays a status other than "(Closed)". It should be noted that interface 700 is graphically arranged to indicate that the general ledger is dependent in some fashion on the plurality of subledgers. In this embodiment, the plurality of subledger icons 710 are disposed below the general ledger icon 740. Additionally, graphical element 790 is positioned to indicate that the plurality of subledgers feeds into the general ledger. In other embodiments, different graphical elements may be used, and the various icons may be arranged in different ways such that it may be made clear to a user that there may be a relationship between the subledgers and the general ledger. For example, a star arrangement could be used wherein the general ledger icon 740 is positioned in the center of a radial arrangement of the plurality of subledger icons 710. In another embodiment, the plurality of subledger icons 710 may be positioned above the general ledger icon 740 with a graphical element that indicates that each of the plurality of subledgers feeds down into the general ledger. It will be understood in light of this disclosure that many different arrangements of icons and other graphical elements may be used to illustrate a relationship between the general ledger and the plurality of subledgers.

Interface 700 may also include controls that may be used to change the views or display other information. For example, control 760 may be used to select among different view options that determine how accounts should be displayed. In this example, control 660 is configured to select a single ledger view. An organization may have one or more subsidiaries, or some departments. The single ledger view allows the display of the general ledger in the subledgers of that subsidiary or department. Control 770 may be used to select a particular subsidiary or department within the organization and thus limit the ledger status and displays to that particular subsidiary or department. Control 780 may be used to adjust the accounting period for the closure status that is displayed. In one embodiment, a date may be selected from a calendar control. It may then be determined that the selected date falls within an accounting period, such as a month or a quarter. The accounting period in which the selected date falls may then be used as the close period. In another embodiment, control 780 may be comprised of two calendar controls from which a starting and ending date may be received that determine the period. In another embodiment, control 780 may include predetermined selections with named accounting periods such as "fiscal year 2010" or "third quarter 2009".

Figure 8:
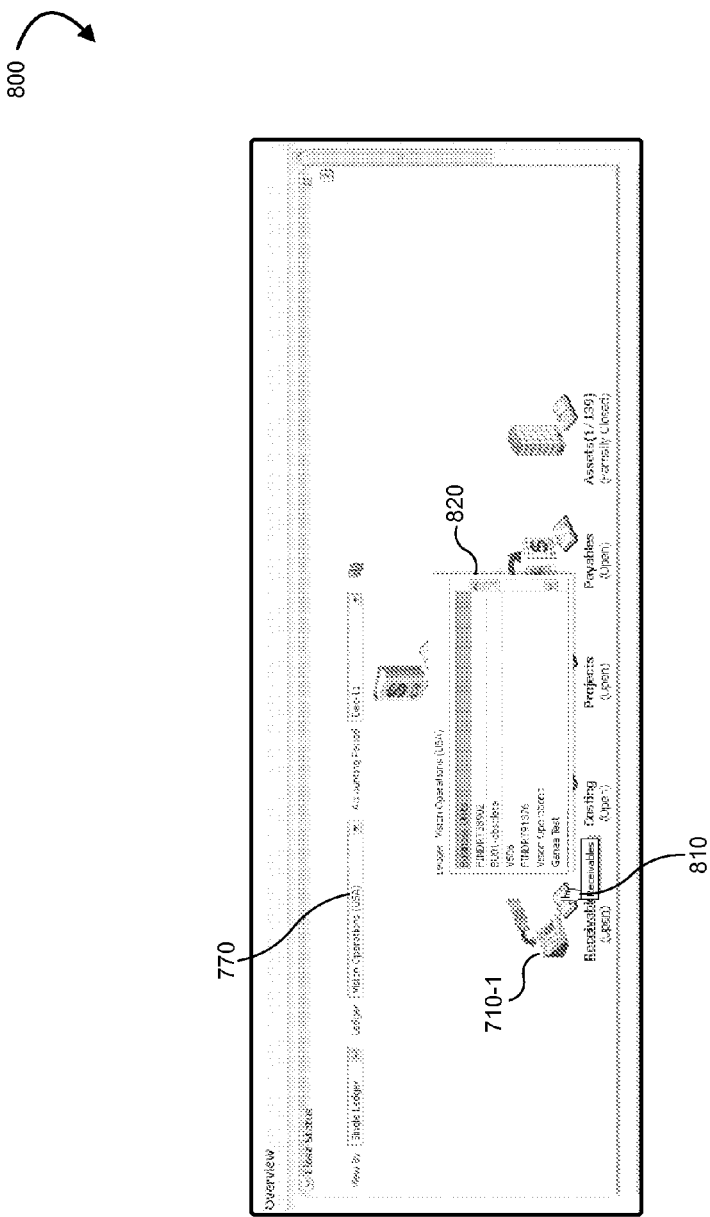
FIG. 8 illustrates an interface for displaying additional information about a subledger, according to one embodiment.

FIG. 8 illustrates an interface 800 for displaying additional information about a subledger, according to one embodiment. In this embodiment, an input may be received by hovering the mouse icon 810 over one of the subledgers. For example, hovering the mouse icon 810 over subledger icon 710-1 associated with the receivables subledger may be considered an input indicating an interest in additional information for that subledger. In response to the input, additional information may be displayed in a pop-up window 820 for accounts associated with the receivables subledger. In this embodiment, a listing of books associated with the subledger selected using control 770 may be displayed. For example, if control 770 selects the "Vision Operations (USA)" ledger, then hovering the mouse icon 810 over subledger icon 710-1 may cause pop-up window 820 to display a list of books associated with the receivables portion of the "Vision Operations (USA)" subsidiary.

Figure 9:
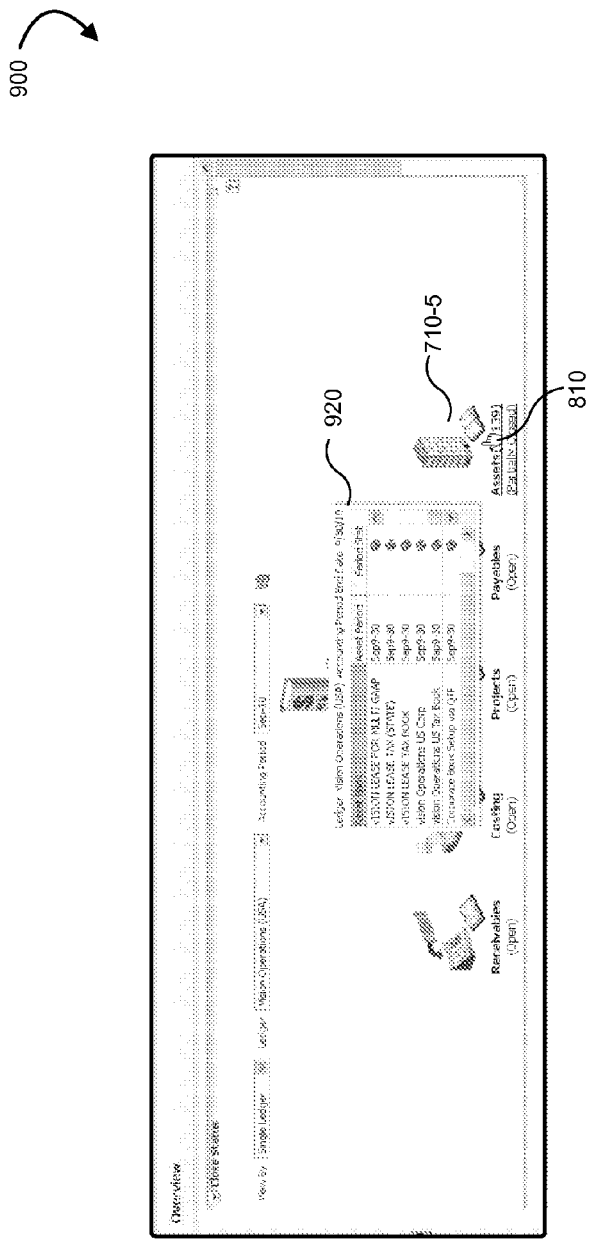
FIG. 9 illustrates another interface for displaying additional information about a subledger, according to one embodiment.

The type of information displayed in pop-up window 820 may depend on the particular subledger for which additional information is being requested. For example, FIG. 9 illustrates another interface 900 for displaying additional information about a subledger, according to one embodiment. In interface 900, the assets subledger may be selected by hovering the mouse icon 810 on top of subledger icon 710-5. In response, pop-up window 920 may be displayed. Window 920 may include books for various assets associated with the selected ledger. In this case, pop-up window 920 includes the of an asset book name, a close period of the asset, and a closure status of the asset over the close period. Note also that the period status in pop-up window 920 is represented by a graphical icon. In this case, the graphical icon is a closed book indicating that the closure status for the period is closed. Also, because the assets subledger may contain books with different asset periods, this additional information may be useful to be displayed in pop-up window 920. Here, the additional information includes the asset period and the period status. In one embodiment, additional information such as this may be displayed for subledgers that have asset periods that do not line up with the asset periods of the other ledgers.

Figure 10:
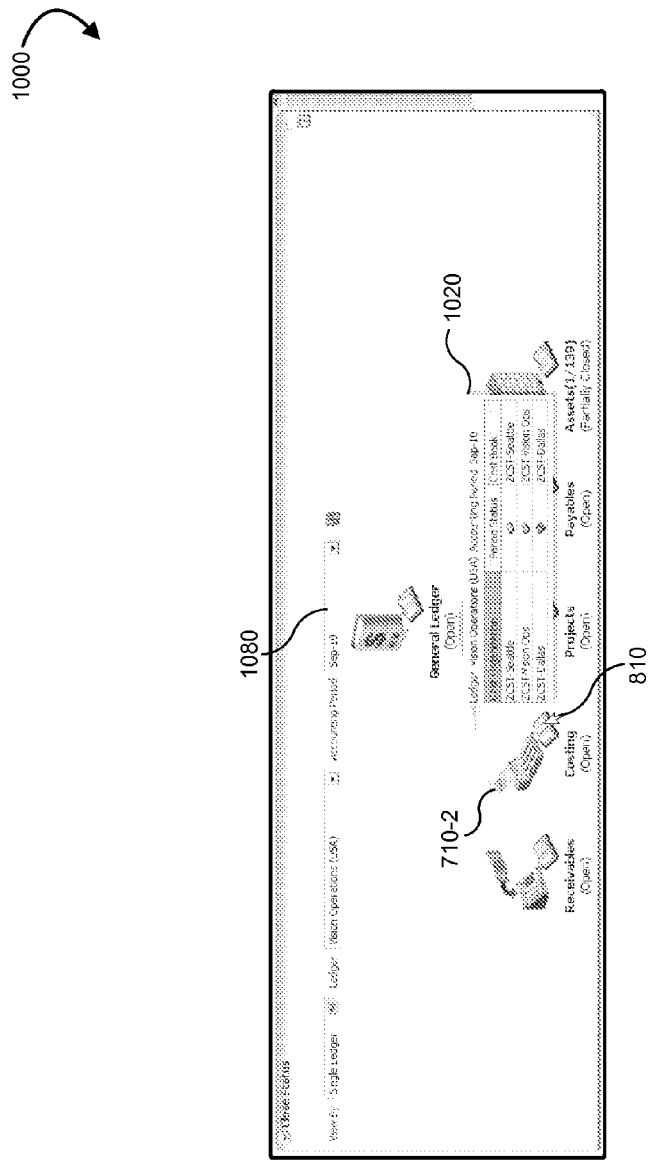
FIG. 10 illustrates another interface for displaying additional information about a subledger, according to one embodiment.

As another example, FIG. 10 illustrates another interface 1000 for displaying additional information about a subledger, according to one embodiment. In interface 1000, the costing subledger may be selected by hovering the mouse icon 800 on top of subledger icon 710-2. In response, pop-up window 1020 may be displayed, which may include different cost books associated with the selected ledger. The pop-up window 1020 may include summary information such as the cost organization, a cost book, and/or a period status. In this example, the period status in the pop-up window may be represented by a graphical icon such as an open book for an open period, and by a closed book for a closed period.

The summary information in pop-up window 1020 may include any information that may be useful in determining why a subledger is not closed. In one embodiment, pop-up window 1020 may include only books that are not closed. In another embodiment, pop-up window 1020 may include books in which there has been recent activity. In yet another embodiment, pop-up window 1020 may include books in which there has been any activity during the close period. In yet another embodiment, pop-up window 1020 may include all of the active books in the subledger.

In pop-up window 1020, the period status indicator may be based on the accounting period designated by control 1080. Thus in FIG. 10, the accounting period may be the month ending with September 10, or may be a period including the date of September 10. Therefore in pop-up window 1020, the period status need not include a range of dates. The information from control 1080 may instead determine the period referred to by the period status indicator.

Figure 11:
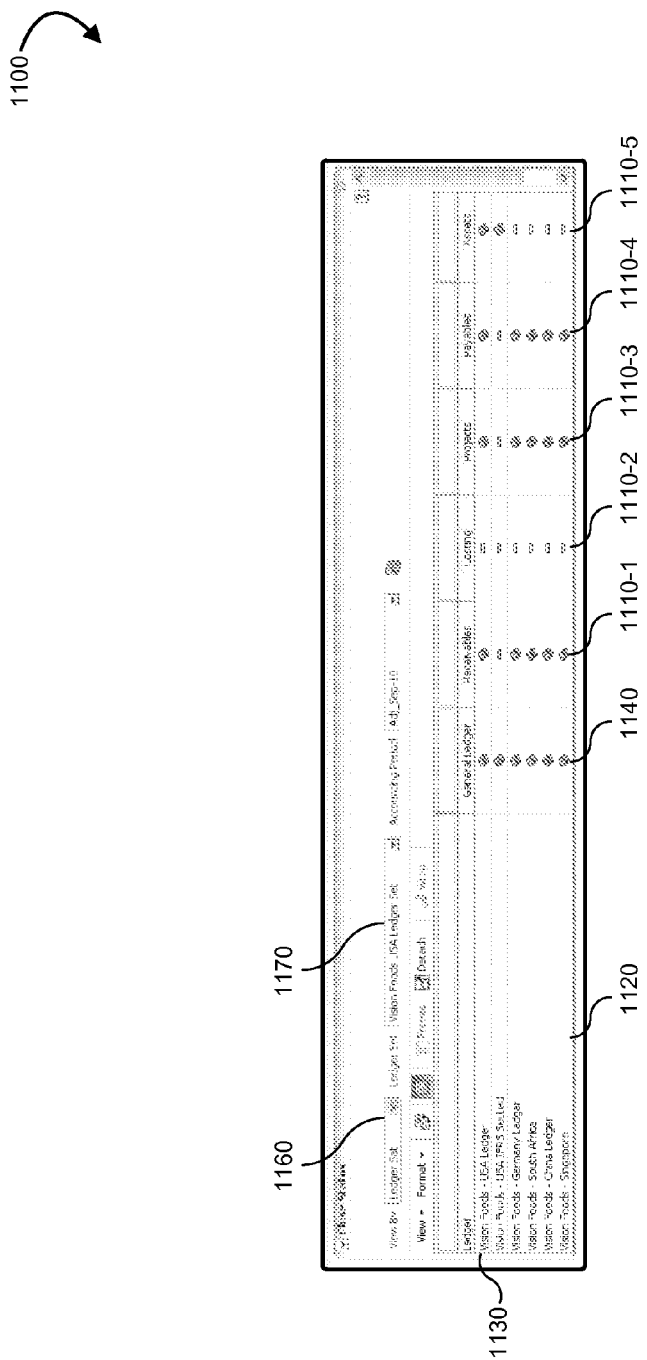
FIG. 11 illustrates an interface that may be used as a status management interface, according to one embodiment.

Interface 1000 of FIG. 10 is but one embodiment for a status management interface. It will be understood in light of this disclosure that many other types of interfaces may be used by various embodiments. In this interface, control 1160 may be configured to display a ledger set view. A ledger set view may display a set of ledgers corresponding to a set of subsidiaries, organizations, departments, and/or the like. Generally, the ledger set view will display multiple ledgers at the same time. Each of these ledgers may correspond to one of the views available in the single ledger view of the previous interfaces. Thus, while interface 1000 a FIG. 10 is useful for evaluating the closure status for a single organization, interface 1100 of FIG. 11 may be useful for evaluating the closer status for a set of organizations or departments.

The ledger set view may display a list of all the ledger sets in the ledger set selected by control 1170. For example, control 1170 may select the "Vision Foods USA" ledger set and display all of the accounts associated with this ledger set in an account list 1120. In the ledger list 1120 may be columns 1110 for each of the subledgers and a column 1140 for the general ledger. The columns 1110 may include a status indicator configured to communicate the closure status of each account within each of the subledgers and the general ledger.

For example, organization 1130 may have entries in the general ledger, the receivables ledger, the projects ledger, the payables ledger, and the assets subledger. The status of any assets belonging to organization 1130 that are entered in the assets subledger may be displayed in column 1110-5 corresponding to the assets subledger. Similarly, any accounts receivable assigned to account 1130 may have their status displayed in column 1110-2 corresponding to the receivables subledger. As was the case in the previously discussed interfaces, an input may be received that selects one of the subledgers for a particular account. In response, interface 1100 may display additional information for the entries in the selected subledger corresponding to the selected account. For example, hovering a mouse icon over the status indicator for organization 1130 in the receivables column may produce a pop-up window displaying additional information for each account receivable in the receivables subledger for the selected account.

Figure 12:
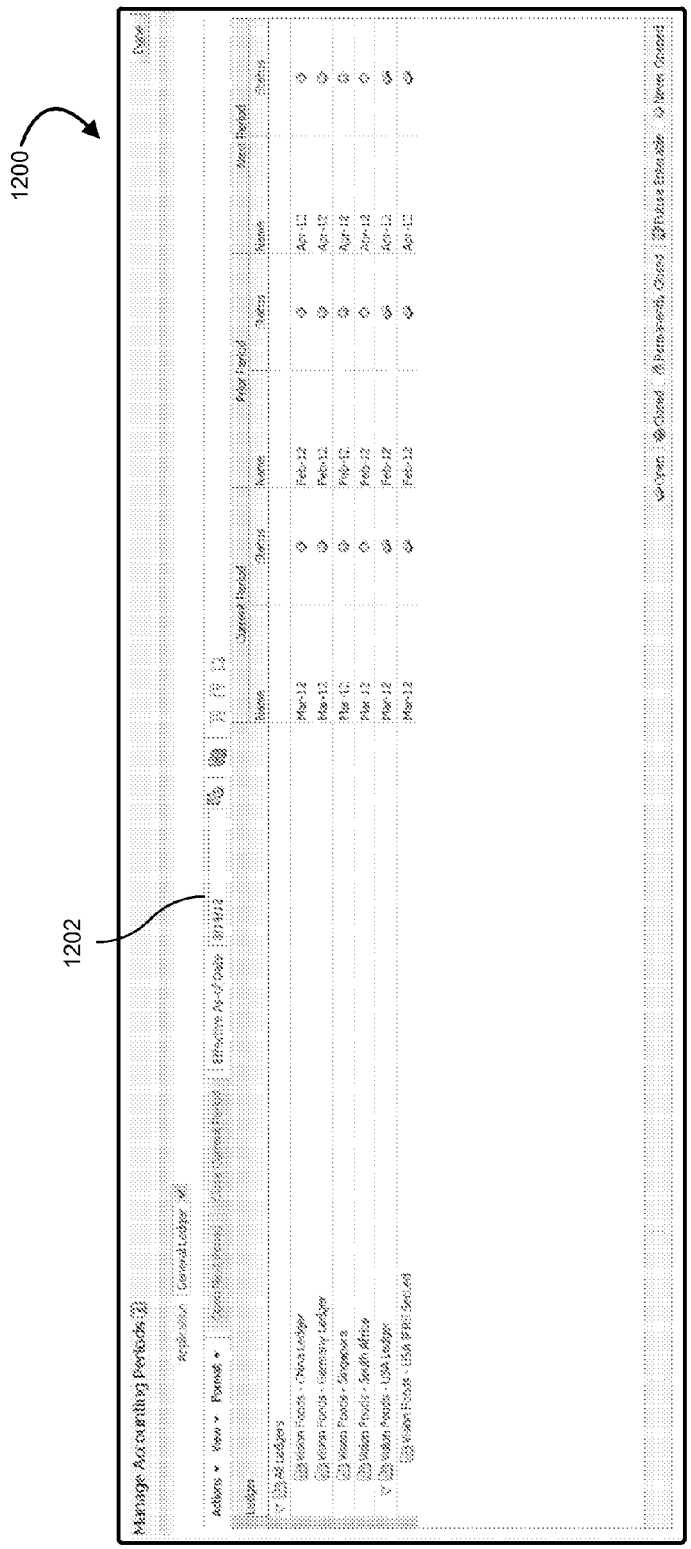
FIG. 12 illustrates an interface for updating the closure statuses of various ledgers, according to one embodiment.

FIG. 12 illustrates an interface 1200 for updating the closure statuses of various ledgers, according to one embodiment. Here, an effective date 1202 may be chosen to select relevant accounting periods. Generally, because closure evaluations will happen after the closure date, the effective date 1202 will be after the end of the period for evaluation. It may also be useful to display the accounting periods surrounding the accounting period under evaluation. In this example, the effective date of Mar. 14, 2012 has been chosen. Therefore the current period beginning on Mar. 12, 2012 is displayed, along with the prior period beginning on Feb. 12, 2012 and the next period beginning on Apr. 12, 2012. Note that for each of the three periods, a closure status indicator is displayed for each ledger in the list. Ledger sets may be displayed in a hierarchical fashion, and individual ledgers may be selected to be updated in interface 1200.

Figure 13:
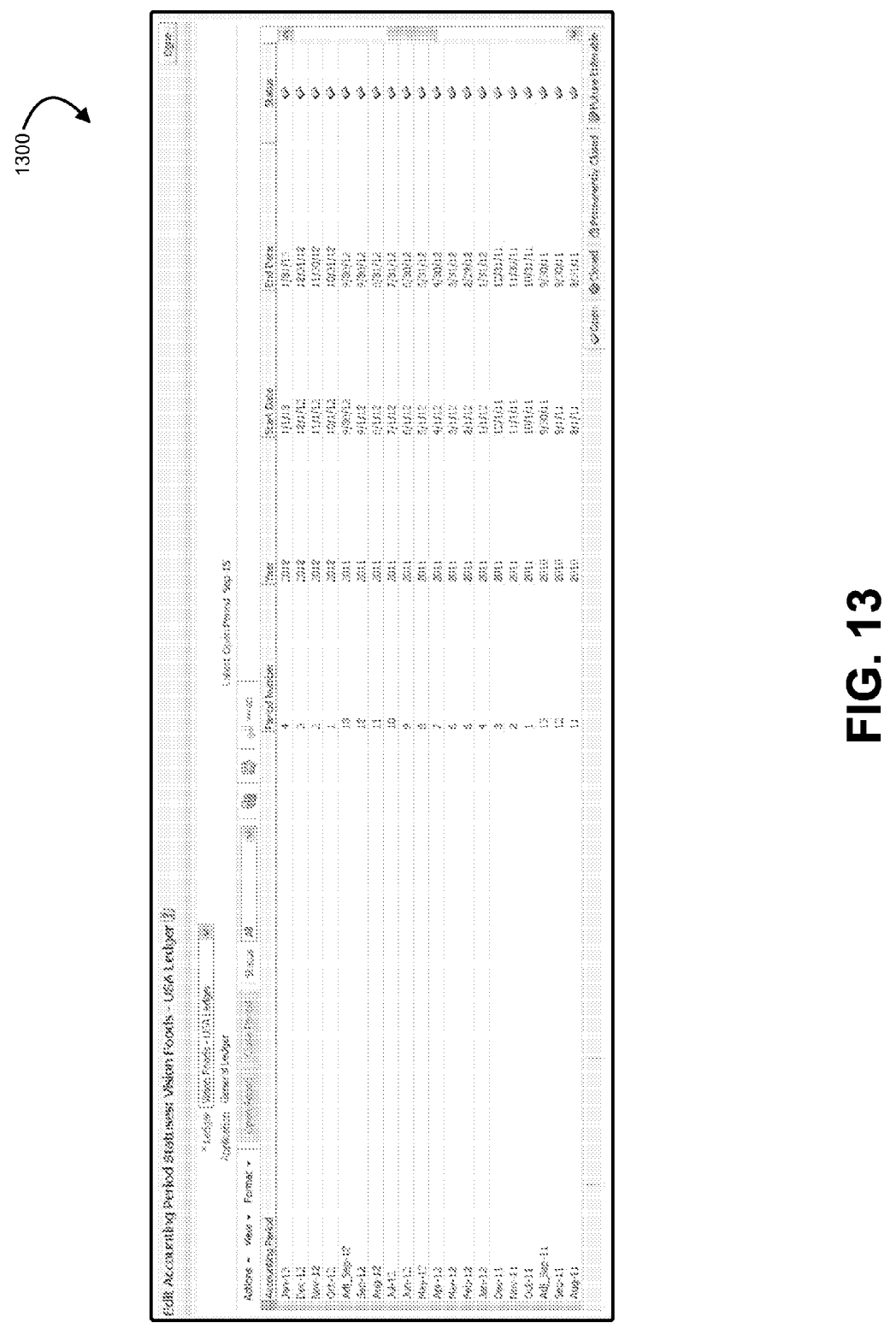

FIG. 13 illustrates an interface 1300 for viewing the closure statuses of a single ledger across multiple accounting periods, according to one embodiment. Interface 1300 may be activated by selecting any single ledger from any of the other interfaces disclosed herein. For example, the ledger corresponding to the "Vision Foods—USA Ledger" may have been selected from the interface in FIG. 11. Interface 1300 may be used to display the closer status for each accounting period over the history of that particular ledger. In this example 13 periods for each year 2009-2012 may be displayed, along with their starting dates, end dates, and statuses. From interface 1300, each of the accounting periods may be closed, opened, and/or otherwise edited. In one embodiment, selecting a particular period from interface 1300 may open an additional interface configured to drill down further into the details of that particular accounting period.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of concurrently assessing a closure status for multiple ledgers in an Enterprise Accounting System, the method comprising:
　　accessing, using a computer system, a general ledger and a plurality of subledgers, wherein:
　　　each of the plurality of subledgers has a close period;
　　　the plurality of subledgers is comprised of a first subledger and a second subledger;
　　　the first subledger has a first close period comprising a first range of dates; and
　　　the second subledger has a second close period comprising a second range of dates that is different from the first range of dates;

for each subledger in the plurality of subledgers, determining, using the computer system, a close status for the subledger over the close period of the subledger, wherein:
- the close status of the first subledger covers the first close period; and
- the close status of the second subledger covers the second close period;

translating, using the computer system, the close status of the second subledger to cover the first range of dates of the first close period instead of the second range of dates of the second close period;

determining, using the computer system, a close status for the general ledger over the first period; and concurrently displaying together in a portal of a display device:
- an icon for the general ledger;
- the close status of the general ledger next to the icon for the general ledger; and
- for each subledger in the plurality of subledgers:
  - an icon for the subledger; and
  - the close status of the subledger next to the icon for the subledger;
- such that the close statuses throughout an organization can be concurrently assessed.

2. The method of claim 1, further comprising:
receiving an input;
determining that the input is associated with the first subledger; and
displaying, in response to the determination, a table comprised of a plurality of books associated with the first subledger.

3. The method of claim 2, wherein the table is further comprised of a close status for each of the plurality of books associated with the first subledger.

4. The method of claim 2, wherein the input comprises a mouse rollover event.

5. The method of claim 1, wherein translating the close status of the second subledger comprises:
determining a close date for the first close period;
determining that the close date falls within the second close period; and
assigning the close status of the second subledger in the second close period to be the close status of the second subledger in the first close period.

6. The method of claim 1, wherein the close status for each subledger is comprised of a selection from the group consisting of:
a closed state;
a partially closed state; and
an open state.

7. The method of claim 1, wherein the plurality of subledgers comprises:
a receivables subledger;
a costing subledger;
a projects subledger;
a payables subledger; and
an assets subledger.

8. The method of claim 1, wherein each of the icons for each of the plurality of subledgers is arranged graphically in relation to the icon for the general ledger to indicate that the general ledger is dependent on the plurality of subledgers.

9. The method of claim 1, wherein the close status of the general ledger is a function of at least the close statuses for each of the plurality of subledgers.

10. A non-transitory computer-readable memory having stored thereon a sequence of instructions which, when executed by one or more processors, causes the one or more processors to assess a closure status for multiple ledgers in an Enterprise Accounting System by:

accessing a general ledger and a plurality of subledgers, wherein:
- each of the plurality of subledgers has a close period;
- the plurality of subledgers is comprised of a first subledger and a second subledger;
- the first subledger has a first close period comprising a first range of dates; and
- the second subledger has a second close period comprising a second range of dates that is different from the first range of dates;

for each subledger in the plurality of subledgers, determining a close status for the subledger over the close period of the subledger, wherein:
- the close status of the first subledger covers the first close period; and
- the close status of the second subledger covers the second close period;

translating the close status of the second subledger to cover the first range of dates of the first close period instead of the second range of dates of the second close period;

determining a close status for the general ledger over the first period; and concurrently displaying together in a portal of a display device:
- an icon for the general ledger;
- the close status of the general ledger next to the icon for the general ledger; and
- for each subledger in the plurality of subledgers:
  - an icon for the subledger; and
  - the close status of the subledger next to the icon for the subledger;
- such that the close statuses throughout an organization can be concurrently assessed.

11. The non-transitory computer-readable memory according to claim 10, wherein the instructions further cause the one or more processors to assess a closure status for multiple ledgers in an Enterprise Accounting System by:
receiving an input;
determining that the input is associated with the first subledger; and
displaying, in response to the determination, a table comprised of a plurality of books associated with the first subledger, and a closure status for each of the plurality of books associate with the first subledger.

12. The non-transitory computer-readable memory according to claim 10, wherein translating the close status of the second subledger comprises:
determining a close date for the first close period;
determining that the close date falls within the second close period; and
assigning the close status of the second subledger in the second close period to be the close status of the second subledger in the first close period.

13. The non-transitory computer-readable memory according to claim 10, wherein each of the icons for each of the plurality of subledgers is arranged graphically in relation to the icon for the general ledger to indicate that the general ledger is dependent on the plurality of subledgers.

14. The non-transitory computer-readable memory according to claim 10, wherein the close status of the general ledger is a function of at least the close statuses for each of the plurality of subledgers.

15. A system comprising:
a processor; and a memory communicatively coupled with and readable by the processor and having stored therein a sequence of instructions which, when executed by the processor, cause the processor to filter a plurality of accounts in an Account Reconciliation Management System by:

accessing a general ledger and a plurality of subledgers, wherein:
- each of the plurality of subledgers has a close period;
- the plurality of subledgers is comprised of a first subledger and a second subledger;
- the first subledger has a first close period comprising a first range of dates; and
- the second subledger has a second close period comprising a second range of dates that is different from the first range of dates;

for each subledger in the plurality of subledgers, determining a close status for the subledger over the close period of the subledger, wherein:
- the close status of the first subledger covers the first close period; and
- the close status of the second subledger covers the second close period;

translating the close status of the second subledger to cover the first range of dates of the first close period instead of the second range of dates of the second close period;

determining a close status for the general ledger over the first period; and concurrently displaying together in a portal of a display device:
- an icon for the general ledger;
- the close status of the general ledger next to the icon for the general ledger; and
- for each subledger in the plurality of subledgers:
  - an icon for the subledger; and
  - the close status of the subledger next to the icon for the subledger;

such that the close statuses throughout an organization can be concurrently assessed.

16. The system of claim 15, wherein the instructions further cause the processors to assess a closure status for multiple ledgers in an Enterprise Accounting System by:
- receiving an input;
- determining that the input is associated with the first subledger; and
- displaying, in response to the determination, a table comprised of a plurality of books associated with the first subledger, and a closure status for each of the plurality of books associate with the first subledger.

17. The system of claim 15, wherein translating the close status of the second subledger comprises:
- determining a close date for the first close period;
- determining that the close date falls within the second close period; and
- assigning the close status of the second subledger in the second close period to be the close status of the second subledger in the first close period.

18. The system of claim 15, wherein each of the icons for each of the plurality of subledgers is arranged graphically in relation to the icon for the general ledger to indicate that the general ledger is dependent on the plurality of subledgers.

19. The system of claim 15, wherein the close status of the general ledger is a function of at least the close statuses for each of the plurality of subledgers.

20. The system of claim 15, wherein the plurality of subledgers comprises:
- a receivables subledger;
- a costing subledger;
- a projects subledger;
- a payables subledger; and
- an assets subledger.

* * * * *

UNITED STATES PATENT AND TRADEMARK OFFICE
CERTIFICATE OF CORRECTION

| | | |
|---|---|---|
| PATENT NO. | : 8,712,879 B2 | Page 1 of 1 |
| APPLICATION NO. | : 13/451976 | |
| DATED | : April 29, 2014 | |
| INVENTOR(S) | : Luk et al. | |

It is certified that error appears in the above-identified patent and that said Letters Patent is hereby corrected as shown below:

In the Specification

In column 8, line 29, delete "and or" and insert -- and/or --, therefor.

In column 8, line 44, delete "and or" and insert -- and/or --, therefor.

In column 12, line 9, delete "and or" and insert -- and/or --, therefor.

Signed and Sealed this
Thirtieth Day of September, 2014

Michelle K. Lee
*Deputy Director of the United States Patent and Trademark Office*